(12) United States Patent
Pagel et al.

(10) Patent No.: US 8,194,674 B1
(45) Date of Patent: Jun. 5, 2012

(54) SYSTEM AND METHOD FOR AGGREGATING COMMUNICATIONS AND FOR TRANSLATING BETWEEN OVERLAPPING INTERNAL NETWORK ADDRESSES AND UNIQUE EXTERNAL NETWORK ADDRESSES

(75) Inventors: Ezra U. Pagel, Austin, TX (US); David A. Babbitt, Round Rock, TX (US); Sameer S. Jagtap, Austin, TX (US)

(73) Assignee: Quest Software, Inc., Aliso Viejo, CA (US)

( * ) Notice: Subject to any disclaimer, the term of this patent is extended or adjusted under 35 U.S.C. 154(b) by 143 days.

(21) Appl. No.: 12/339,053

(22) Filed: Dec. 19, 2008

Related U.S. Application Data

(60) Provisional application No. 61/015,306, filed on Dec. 20, 2007.

(51) Int. Cl.
*H04L 12/28* (2006.01)
(52) U.S. Cl. ... 370/393; 370/397; 370/399; 370/395.31; 370/401
(58) Field of Classification Search ............. 370/392, 370/393, 396, 397, 399, 395.3, 395.31, 401
See application file for complete search history.

(56) References Cited

U.S. PATENT DOCUMENTS

| | | |
|---|---|---|
| 4,912,628 A | 3/1990 | Briggs |
| 5,062,037 A | 10/1991 | Shorter et al. |
| 5,201,049 A | 4/1993 | Shorter |
| 5,611,050 A | 3/1997 | Theimer et al. |
| 5,757,924 A | 5/1998 | Friedman et al. |
| 5,802,290 A | 9/1998 | Casselman |
| 5,805,824 A | 9/1998 | Kappe |
| 5,917,997 A | 6/1999 | Bell et al. |
| 5,996,026 A | 11/1999 | Onodera et al. |
| 5,999,518 A | 12/1999 | Nattkemper et al. |
| 6,003,050 A | 12/1999 | Silver et al. |
| 6,006,264 A | 12/1999 | Colby et al. |
| 6,023,724 A | 2/2000 | Bhatia et al. |
| 6,038,566 A | 3/2000 | Tsai |
| 6,041,347 A | 3/2000 | Harsham et al. |
| 6,067,545 A | 5/2000 | Wolff |
| 6,069,894 A | 5/2000 | Holender et al. |
| 6,075,938 A | 6/2000 | Bugnion et al. |
| 6,092,178 A | 7/2000 | Jindal et al. |

(Continued)

OTHER PUBLICATIONS

Baltazar, Henry. "Virtual Storage Age" eWEEK, pp. 45 and 48. Aug. 27, 2001. Ziff Davis Media Inc., New York, New York.

(Continued)

*Primary Examiner* — Marsha D Banks Harold
*Assistant Examiner* — Bo Hui A Zhu
(74) *Attorney, Agent, or Firm* — Knobbe Martens Olson & Bear LLP

(57) ABSTRACT

A gateway device including an access interface to an external network, a trunked interface, and translation logic. The access interface is associated with multiple external source addresses. The trunked interface is interfaced with multiple different virtual local area networks (VLANs), where each VLAN is associated with a corresponding VLAN tag and at least one of potentially overlapping internal source addresses. The translation logic translates between each external source address and each unique combination of internal source address and VLAN tag. A method of network address translation including assigning one of first network addresses to each first device of a first network, dividing the first network into a plurality of VLANs, separating the first devices with the same first network address into different VLANs, and assigning first devices with the same first address to different second network addresses.

3 Claims, 5 Drawing Sheets

U.S. PATENT DOCUMENTS

| | | | |
|---|---|---|---|
| 6,104,699 A | 8/2000 | Holender et al. |
| 6,118,784 A | 9/2000 | Tsuchiya et al. |
| 6,130,892 A | 10/2000 | Short et al. |
| 6,185,601 B1 | 2/2001 | Wolff |
| 6,192,417 B1 | 2/2001 | Block et al. |
| 6,247,057 B1 | 6/2001 | Barrera, III |
| 6,256,637 B1 | 7/2001 | Venkatesh et al. |
| 6,263,358 B1 | 7/2001 | Lee et al. |
| 6,272,523 B1 | 8/2001 | Factor |
| 6,272,537 B1 | 8/2001 | Kekic et al. |
| 6,282,602 B1 | 8/2001 | Blumenau et al. |
| 6,347,328 B1 | 2/2002 | Harper et al. |
| 6,370,560 B1 | 4/2002 | Robertazzi et al. |
| 6,453,426 B1 | 9/2002 | Gamache et al. |
| 6,496,847 B1 | 12/2002 | Bugnion et al. |
| 6,535,511 B1 | 3/2003 | Rao |
| 6,553,401 B1 | 4/2003 | Carter et al. |
| 6,567,839 B1 | 5/2003 | Borkenhagen et al. |
| 6,571,283 B1 | 5/2003 | Smorodinsky |
| 6,607,545 B2 | 8/2003 | Kammerer et al. |
| 6,609,213 B1 | 8/2003 | Nguyen et al. |
| 6,625,705 B2 | 9/2003 | Yanai et al. |
| 6,633,916 B2 | 10/2003 | Kauffman |
| 6,640,239 B1 | 10/2003 | Gidwani |
| 6,665,304 B2 | 12/2003 | Beck et al. |
| 6,745,303 B2 | 6/2004 | Watanabe |
| 6,760,775 B1 | 7/2004 | Anerousis et al. |
| 6,865,613 B1 | 3/2005 | Millet et al. |
| 6,880,002 B2 | 4/2005 | Hirschfeld et al. |
| 6,931,003 B2 | 8/2005 | Anderson |
| 6,985,479 B2 | 1/2006 | Leung et al. |
| 6,985,485 B2 | 1/2006 | Tsuchiya et al. |
| 6,985,937 B1 | 1/2006 | Keshav et al. |
| 6,990,666 B2 | 1/2006 | Hirschfeld et al. |
| 7,020,720 B1 | 3/2006 | Donahue et al. |
| 7,043,665 B2 | 5/2006 | Kern et al. |
| 7,065,589 B2 | 6/2006 | Yamagami |
| 7,076,560 B1 | 7/2006 | Lango et al. |
| 7,139,841 B1 | 11/2006 | Somasundaram et al. |
| 7,154,891 B1 | 12/2006 | Callon |
| 7,200,622 B2 | 4/2007 | Nakatani et al. |
| 7,215,669 B1 | 5/2007 | Rao |
| 7,219,161 B1 | 5/2007 | Fagundo et al. |
| 7,222,172 B2 | 5/2007 | Arakawa et al. |
| 7,234,075 B2 | 6/2007 | Sankaran et al. |
| 7,257,584 B2 | 8/2007 | Hirschfeld et al. |
| 7,280,557 B1 | 10/2007 | Biswas et al. |
| 7,287,186 B2 | 10/2007 | McCrory et al. |
| 7,356,679 B1 | 4/2008 | Le et al. |
| 7,421,505 B2 | 9/2008 | Berg |
| 7,574,496 B2 | 8/2009 | McCrory et al. |
| 7,643,484 B2 | 1/2010 | Willman et al. |
| 7,769,004 B2 | 8/2010 | Johnson et al. |
| 2002/0065864 A1 | 5/2002 | Hartsell et al. |
| 2002/0103889 A1 | 8/2002 | Markson et al. |
| 2002/0129082 A1 | 9/2002 | Baskey et al. |
| 2002/0152310 A1 | 10/2002 | Jain et al. |
| 2002/0159447 A1 | 10/2002 | Carey et al. |
| 2002/0184642 A1 | 12/2002 | Lude et al. |
| 2002/0194251 A1 | 12/2002 | Richter et al. |
| 2003/0005104 A1 | 1/2003 | Deborer et al. |
| 2003/0005166 A1 | 1/2003 | Seidman |
| 2003/0018927 A1 | 1/2003 | Gadir et al. |
| 2003/0023774 A1 | 1/2003 | Gladstone et al. |
| 2003/0105829 A1 | 6/2003 | Hayward |
| 2003/0188233 A1 | 10/2003 | Lubbers et al. |
| 2004/0044778 A1 | 3/2004 | Alkhatib et al. |
| 2004/0052216 A1* | 3/2004 | Roh ............................ 370/252 |
| 2004/0078467 A1 | 4/2004 | Grosner et al. |
| 2004/0186905 A1 | 9/2004 | Young et al. |
| 2005/0013280 A1 | 1/2005 | Buddhikot et al. |
| 2005/0044220 A1 | 2/2005 | Madhavan |
| 2005/0228835 A1 | 10/2005 | Roa |
| 2005/0229175 A1 | 10/2005 | McCrory et al. |
| 2005/0240668 A1 | 10/2005 | Rolia et al. |
| 2005/0240964 A1 | 10/2005 | Barrett |
| 2005/0246436 A1 | 11/2005 | Day et al. |
| 2005/0249199 A1 | 11/2005 | Albert et al. |
| 2006/0013209 A1* | 1/2006 | Somasundaram ............ 370/389 |
| 2006/0136490 A1 | 6/2006 | Aggarwal et al. |
| 2006/0282892 A1* | 12/2006 | Jonnala et al. .................. 726/23 |
| 2006/0288251 A1 | 12/2006 | Jackson |
| 2007/0005769 A1 | 1/2007 | Ammerlaan et al. |
| 2007/0088721 A1 | 4/2007 | Srivastava |
| 2007/0180453 A1 | 8/2007 | Burr et al. |
| 2008/0240122 A1* | 10/2008 | Richardson et al. .......... 370/401 |
| 2010/0281181 A1 | 11/2010 | Johnson et al. |

OTHER PUBLICATIONS

Vizard, Michael. "Automated Help is on the Horizion." InfoWorld, Mar. 1, 2002. InfoWorld Media Group, San Francisco, CA.

Long et al., "Swift/RAID: A Distributed RAID System", Summer 1994, Computing Systems, vol. 7, Issue 3.

PCT Notification of Transmittal of the International Search Report or the Declaration for PCT/US02/28011, dated Feb. 25, 2003, 5 pages.

PCT Notification of Transmittal of the International Search Report or the Declaration for PCT/US02/40286, dated Mar. 28, 2003, 3 pages.

Stonebraker et al., "Distributed RAID—A New Multiple Copy Algorithm", 1990, IEEE.

\* cited by examiner

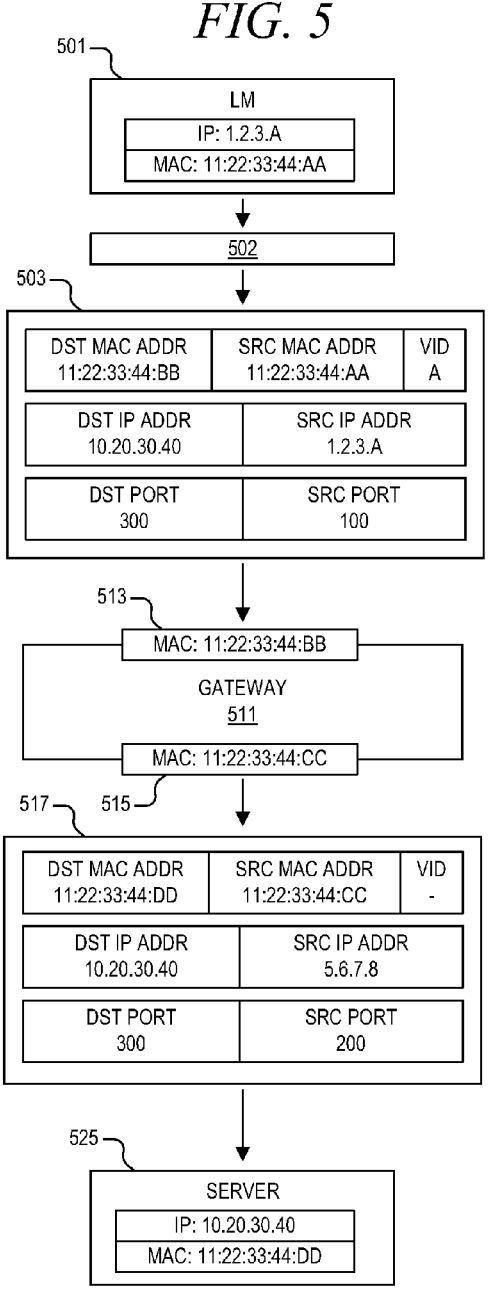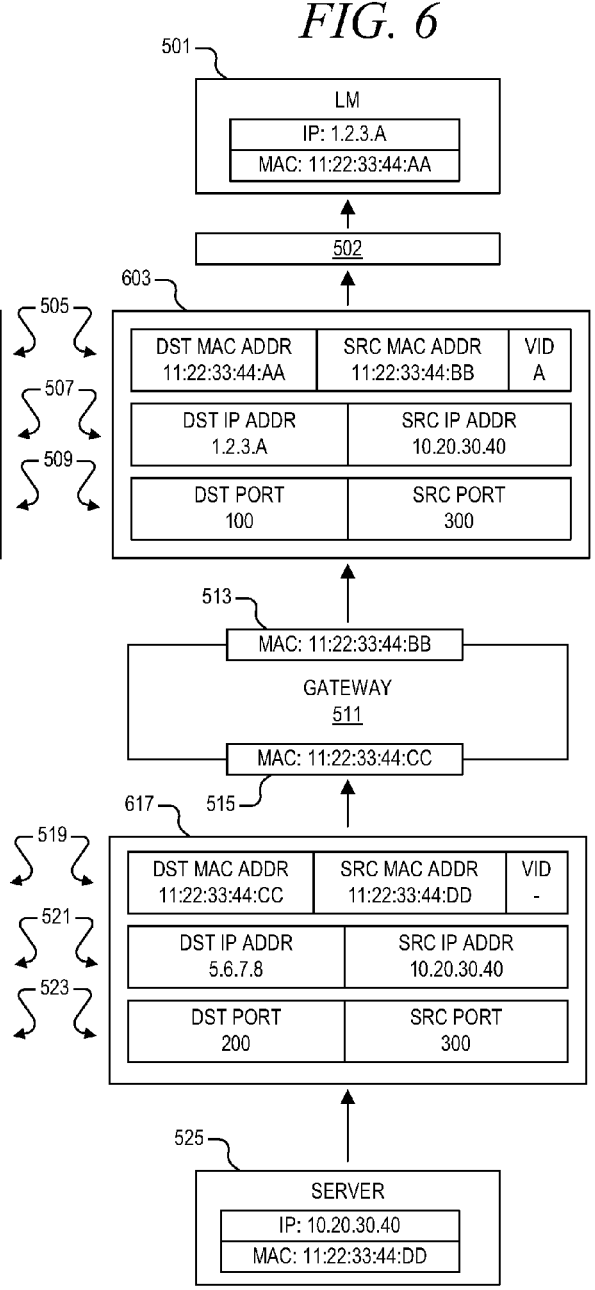

SYSTEM AND METHOD FOR AGGREGATING COMMUNICATIONS AND FOR TRANSLATING BETWEEN OVERLAPPING INTERNAL NETWORK ADDRESSES AND UNIQUE EXTERNAL NETWORK ADDRESSES

CROSS-REFERENCE TO RELATED APPLICATIONS

This application claims the benefit of U.S. Provisional Application Ser. No. 61/015,306 filed on Dec. 20, 2007 which is incorporated herein by reference for all intents and purposes.

BACKGROUND OF THE INVENTION

1. Field of the Invention

The present invention relates to network address translation, and more specifically to performing network address translation among different virtual local area networks (VLANs) with potentially overlapping address ranges onto an external network with unique addresses.

2. Description of the Related Art

Conventional network devices, such as routers, switches, hubs, repeaters, etc., are generally not configured to handle network address conflicts, such as two or more computers or servers having the same internet protocol (IP) address within a local area network (LAN) or a common virtual LAN (VLAN). A VLAN is a group of hosts with a common set of requirements that communicate as if they were attached to the same wire, regardless of their physical location. In computer networking, Network Address Translation (NAT), also known as Network Masquerading, Native Address Translation or IP Masquerading, is a technique of transceiving network traffic through a router that involves re-writing the source and/or destination IP addresses and usually also the Transmission Control Protocol/User Datagram Protocol (TCP/UDP) port numbers of IP packets (or frames) as they pass through. NAT allows identical IP addresses to be used within each of many different and independent local or private networks while further enabling communication with an external or public network through a router. The router employs NAT to assign a unique external address to be used in the external or public network domain. In conventional configurations, however, the same network address may not be used within the same network or between VLANs in which communications are aggregated through a common router.

The problem of using identical network addresses most often arises when provisioning one or more virtual (or logical) servers using virtualization technology (not to be confused with the "virtual" aspect of a VLAN) to deliver an application within a network. A logical server operates in the same manner as a physical machine configured in the same manner, but is provided as a separate and independent virtual machine and is used much like a physical computer. Virtualization technology transforms the function of a physical computer (virtualization host) to operate as if it were multiple computers in which each virtualized computer or virtual machine (VM) mimics the same basic architecture as that of a generic physical computer. Virtualization technology provides a software layer called abstraction. In one abstraction configuration, virtualization software executes as an application on the operating system (OS) of the underlying physical host computer system and enables multiple virtual machines to be defined within the virtualized environment. Alternatively, the underlying physical host computer executes a hypervisor replacing the host OS, where the hypervisor sits on top of the computer hardware rather than the OS. In either case, the abstraction layer provides virtual isolation so that each virtual machine is operated substantially independent of other virtual machines on the same physical host. Virtualization technology overrides the attributes of the underlying physical server and allows the virtual machines to share the physical resources of the underlying computer host. Virtualized isolation allows each virtual machine to execute its own separate OS even if otherwise inconsistent with the OS of any other virtual machine or with the OS of the underlying physical system. In this manner, virtualization technology enables multiple applications to be executed on the same host even if the applications are otherwise incompatible, which in turn increases the overall utilization of the physical host.

In a virtualization system, an application may be implemented with one or more multiple virtual machines or logical servers having common attributes including identical network addresses. Each virtual machine is stored as an image until activated and provisioned by a management or control server. Multiple copies of a single virtual machine image can be provisioned to execute simultaneously within a network. Without some form of network partitioning or modification to the IP address configuration of each VM instance, however, the multiple identical VMs experience IP address conflict and connectivity disruption. Connecting each instance to a VLAN provides isolation and allows multiple concurrent deployments of the same IP address without conflict, but prevents any external communication of the VLANs through a common gateway. Typically, external or inter-VLAN communication is accomplished via a router with knowledge of each unique subnet per VLAN. If there is an overlap among the per-VLAN subnets, a traditional router cannot uniquely identify the constituent devices for routing traffic resulting a conflict and communication failure.

Although the problem of duplicate addresses is more pervasive in virtualized systems using virtualization technology, the problem also arises in other platforms including physical configurations.

Aggregating communication of multiple devices with potentially duplicate network addresses and providing a unique IP identity could be accomplished by using a dedicated NAT router per VLAN, but the maintenance and resource cost of running and coordinating multiple routers can be high and even prohibitive for a large number of VLANs. Alternatively, each IP device may use a low-level driver to perform NAT itself, but this requires configuration of each constituent device which is disadvantageous.

BRIEF DESCRIPTION OF THE DRAWINGS

The benefits, features, and advantages of the present invention will become better understood with regard to the following description, and accompanying drawing in which:

FIG. 5 is a block diagram illustrating frame information processing performed by an intermediate gateway device implemented according to one embodiment on a frame sent by a local machine within a local VLAN to a server located on an external network; and FIG. 6 is a block diagram illustrating frame information processing performed by an intermediate gateway device of FIG. 5 implemented according to one embodiment on a return frame sent by the server to the local machine of FIG. 5.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A network system according to an embodiment of the present invention enables network address translation (NAT) among different virtual local area networks (VLANs) with potentially overlapping address ranges onto a network with unique IP addresses. An intermediate network system has multiple interfaces on separate VLANs, acts as a gateway for each serviced network, and provides unique address mappings for each constituent IP device. The system can service either unique or identical networks, including identical TCP connections, by tracking traffic by VLAN in addition to source and destination IP, port number, and media access control (MAC) address. The system maintains rules based on incoming NAT destination address, VLAN source device, source MAC address, etc., and allows multiple copies of the same IP device to coexist.

Figure 1:
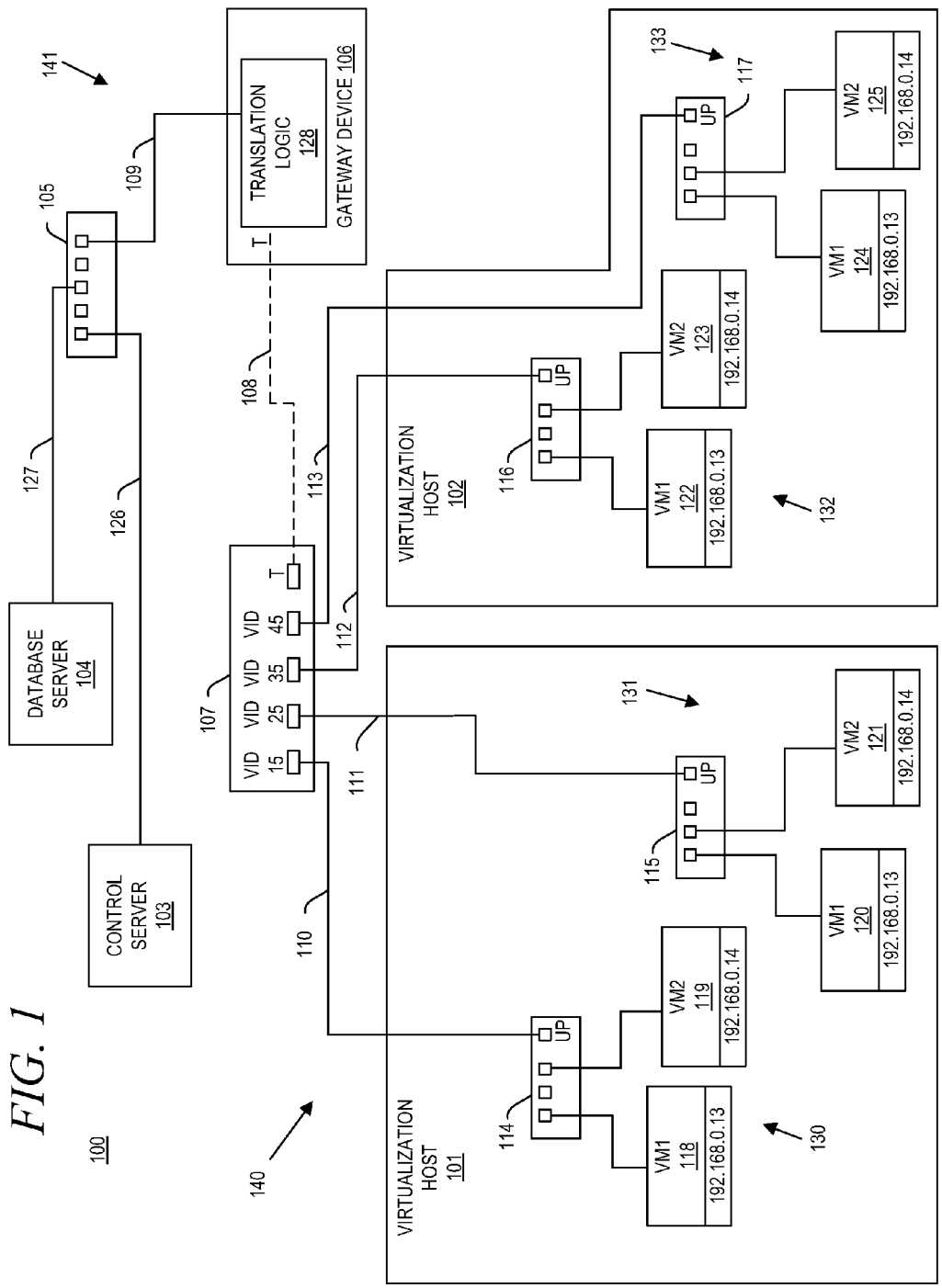
FIG. 1 is a figurative diagram of a network implemented according to one embodiment.

FIG. 1 is a figurative diagram of a network 100 implemented according to one embodiment. The network 100 includes first and second virtualization hosts 101 and 102, a control server 103, a database server 104 and a gateway device 106 coupled together or otherwise interfaced via corresponding switch devices 105 and 107. The network 100 is illustrated using virtualization technology, where it is understood that the present invention is not limited to virtual embodiments but equally applies to physical configurations and implementations. The control server 103 and the database server 104 are coupled to respective ports of the switch device 105 via respective network links 126 and 127, and another port of the switch device 105 is coupled to the gateway device 106 via a network link 109. The switch device 107, which also includes switched ports or the like, is interfaced with the gateway server 106 via a "trunked" network link 108. The trunked interface 108 is shown using a dashed line indicating aggregation of communications as further described below. The virtualization host 101 interfaces the switch device 107 via corresponding network links 110 and 111 and the virtualization host 102 interfaces the switch device 107 via corresponding network links 112 and 113.

The control server 103 schedules multiple concurrent deployments of two virtual machine (VM) applications on each of the virtualization hosts 101 and 102. As understood by those skilled in the art, a virtualization host is an underlying physical host computer system (not shown) employing virtualization technology, which provides an abstraction layer on each virtualization host system for defining multiple logical servers or VMs within a virtualized environment. As shown, VMs 118, 119, 120 and 121 are provisioned on the virtualization host 101 and VMs 122, 123, 124 and 125 are provisioned on virtualization host 102. As shown, the VMs 118-125 are each provisioned from two different VM applications (images or instances or the like) VM1 and VM2, in which VMs 118, 120, 122 and 124 are provisioned from VM1 and VMs 119, 121, 123 and 125 are provisioned from VM2. The control server 103 configures the gateway device 106 for the IP addresses of the upcoming deployments, and dynamically selects a VLAN for each VM instance. As shown, the VM1 and VM2 are assigned two different "internal" or "local" IP addresses 192.168.0.13 and 192.168.0.14, respectively. The specific IP addresses are arbitrary and may be any suitable values as understood by those skilled in the art. Thus, each VM pair 118 and 119, 120 and 121, 122 and 123, and 124 and 125 retain the respective IP addresses 192.168.0.13 and 192.168.0.14.

On the virtualization host 101, the VMs 118 and 119 are coupled to respective ports of a switch device 114 and the VMs 120 and 121 are coupled to respective ports of another switch device 115. On the virtualization host 102, the VMs 122 and 123 are coupled to respective ports of a switch device 116 and the VMs 124 and 125 are coupled to respective ports of another switch device 117. In one embodiment, the switch devices 114-117 are "virtual" devices which operate in the virtual environment in substantially the same manner as a physical switch operates in the physical environment. Each of the switch devices 114-117 has an uplink port "UP" coupled to corresponding ports of the switch device 107 via the respective network links 110, 111, 112 and 113. The switch device 107 and the gateway device 106 are shown outside the virtualization hosts 101 and 102, although either or both of these devices may be implemented as virtual devices on either virtualization host 101 and 102. Alternatively, any of the switch devices may be implemented as physical devices. Each of the switch devices 114-117 enable network communications between the pair of VMs coupled to the respective switch devices. For example, the VMs 118 and 119 are able to communicate with each other via the switch device 114.

The VMs 118-125 are "local" devices within a local network 140, such as a local area network (LAN) or the like. The control server 103 and the database server 104 are located in an external network 141. The external network 141 is "external" relative to the local devices and may simply be another network, internal or external, or may incorporate larger networks and may be interfaced with one or more public networks, such as the internet or the like. It is desired that each of the VMs 118-125 have access to the services of any external network without conflict. The switch device 107 may be configured in substantially similar manner to enable communication between its ports so that the VMs 118-125 would otherwise be able to communicate with each other. Such communication causes conflicts, however, because the IP addresses are duplicated or otherwise overlapping. In particular, since the VMs 118, 120, 122 and 124 have the same IP address 192.168.0.13, and since the VMs 119, 121, 123 and 125 have the same IP address 192.168.0.14, such IP address duplication otherwise causes communication conflict within the local or internal network. Furthermore, communication to a different network, such as another internal or an external network or the like, is problematic given the local address conflicts.

The control server 103 configures the target virtualization hosts 101 and 102 to perform VLAN "tagging" of the switch devices 114, 115, 116, 117 for each VM pair. As shown, the VMs 118 and 119 are in a first VLAN 130, the VMs 120 and 121 are in a second VLAN 131, the VMs 122 and 123 are in a third VLAN 132, and the VMs 124 and 125 are in a fourth VLAN 133. In this manner, the local network 140 is divided into four VLANs 130-133. In one embodiment, the switch 107 is "VLAN aware" so that each of its ports may be assigned a VLAN identifier (VID) or VLAN tag or the like. As shown, the network link 110 is coupled to a port assigned VID 15 as a tag for the VLAN 130, the network link 111 is coupled to a port assigned VID 25 as a tag for the VLAN 131, the network link 112 is coupled to a port assigned VID 35 as a tag for the VLAN 132, and the network link 113 is coupled to a port assigned VID 45 as a tag for the VLAN 133. The particular VIDs illustrated are arbitrary where it is understood by those skilled in the art that VIDs are typically 12-bit values which typically range from 0-4095. The switch device 107 uses the VIDs to logically segment the local network to prevent communication conflicts within the local network between VMs having the same IP address. In this manner, the VMs 118 and 119 on the VLAN 130 may communicate with each other without conflict with any of the VMs of the other VLANs 131-133.

The switch 107 further includes a "trunked" uplink port T coupled to a trunked interface of a gateway device 106 via the trunked network link 108. A trunked interface aggregates communications from multiple networks. In the illustrated configuration, the communications on the VLANs 130-133 are aggregated on the trunked network link 108 and provided to the gateway device 106. In one embodiment, the gateway device 106 sees traffic "framed" with VLAN tags from each virtual machine application instance 118-125 of each of the VLANs 130-133. As understood by those skilled in the art, communications are in the form of packets or frames with frame headers incorporating the VLAN tag or VID. The gateway device 106 further includes an external access interface coupled via the external network link 109 to a port of the switch device 105 of the external network 141. The switch device 105 is "external" in the sense that it is outside or separate from the internal or local network 140 of the VLANs 130-133. The external network 141 may be a different internal or "local" network and may even be within a different VLAN. The switch device 105 may be implemented as a virtual device on either of the virtualization hosts 101 or 102 or any other virtualization hosts interfaced therewith, or may alternatively be implemented as a physical device. The switch device 105 includes ports for interfacing the network links 126 and 127 for enabling communications with the control server 103 and the database server 104. The gateway device 106 acts as the gateway for the VLANs 130-133 of the local network 140 for enabling each of the VMs 118-125 to access devices and services on or via the external network 141.

The gateway device 106 performs address translation for each VM 118-125 of the local network, in which it assigns a unique external address on the external network to allow traffic to any of the resources on the external network, such as the database server 104. In the illustrated embodiment, the gateway device 106 includes translation logic 128 that translates communications between the trunked network link 108 and the external access link 109. The translation logic 128 enables communication between any of the VMs 118-125 of any of the local VLANs to communicate with external devices, such as the database server 104. Although communications may be enabled with the control server 103, the control server 103 may be isolated to perform dedicated management functions. In a conventional NAT function, communication conflict otherwise arises because of the duplicate IP addresses. A conventional NAT maps the internal or local addresses with one or more external addresses. In a 1:N (or "one-to-many") configuration, all of the internal addresses are translated between one external address, such as performed in a typical router or the like. Alternatively, in a 1:1 (or "one-to-one") translation, each internal address is assigned a unique external address for external communications. In either case, however, the conventional tuple employed by the conventional NAT is insufficient so that the NAT function is unable to distinguish between devices having the same IP address. For example, a conventionally configured gateway assigns the same external address to communications from any of the VMs having the same IP address (e.g., 118, 120, 122 and 124), so that the conventional gateway is unable to resolve the correct destination for response communications from external devices.

In one embodiment, the VLAN ID in the header of each communication packet is programmed by the switch device 107 with the appropriate VID to enable the gateway device 106 to distinguish communications from among the VMs of the VLANs 130-133 with identical IP addresses. For example, a frame from VM1 118 with IP address 192.168.0.13 has VID 15 whereas a frame from VM1 124, also with IP address 192.168.0.13, has VID 45. As described further below, the translation logic 128 employs a connection tracking table 220 (FIG. 2) which is augmented to include the VLAN identifier or VID to enable unique address translation to enable external communications without conflict.

Figure 2:
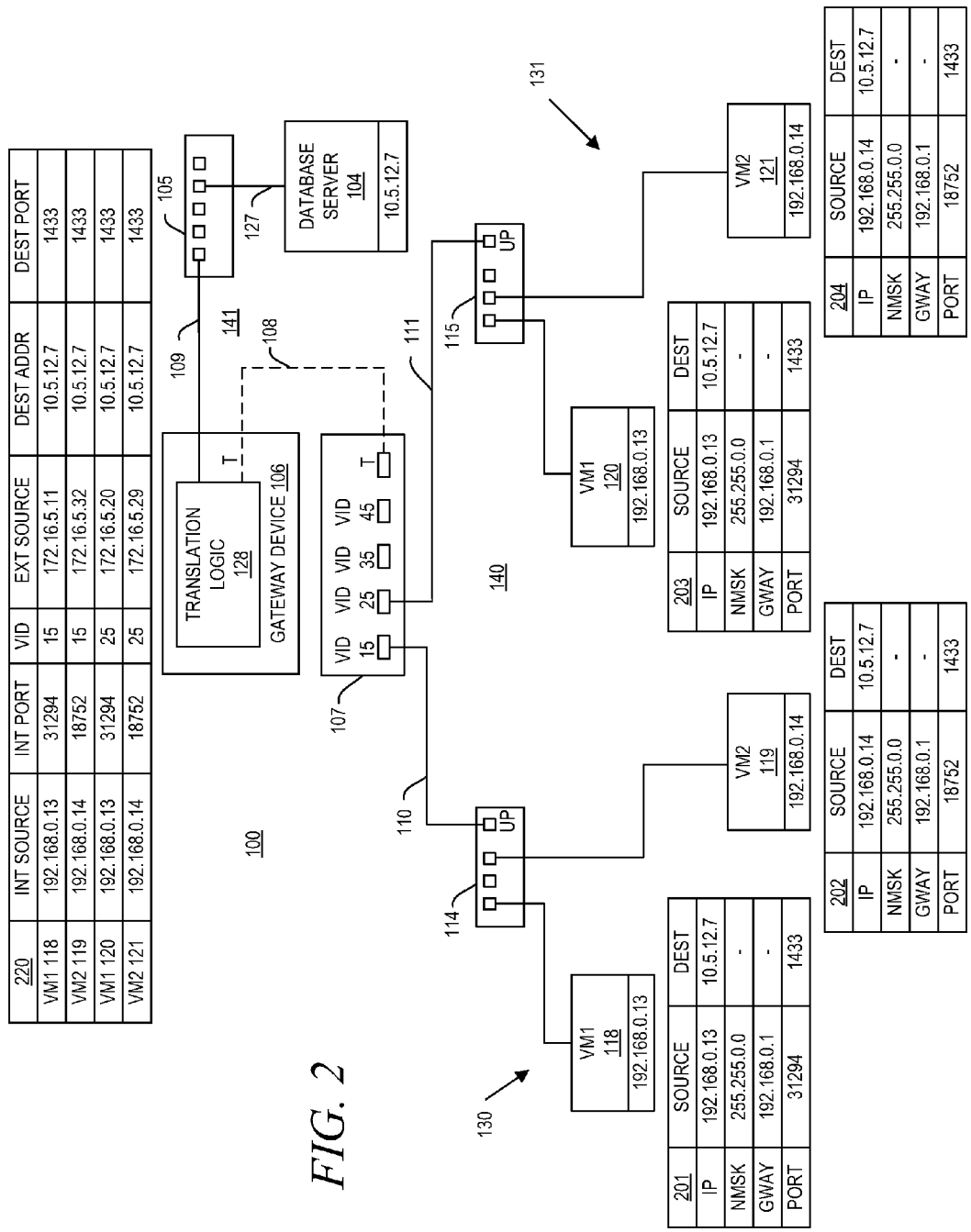
FIG. 2 is a figurative diagram of a portion of the network of FIG. 1 including certain VMs of corresponding VLANs and the switch device of the local network coupled via the gateway device to the database server and the switch device of the external network of FIG. 1.

FIG. 2 is a figurative diagram of a portion of the network 100 including the VMs 118-121 of the VLANs 130 and 131 and the switch device 107 of the local network 140 coupled via the gateway device 106 to the database server 104 and the switch device 105 of the external network 141. The database server 104 is assigned an IP address 10.5.12.7 within the external network 141. Again, the VMs 118 and 120 have identical source IP addresses and the VMs 119 and 121 have identical source IP addresses. Nonetheless, it is desired that all four VMs 118-121 have access to the data or services of the database server 104. Four tables 201, 202, 203 and 204 include the IP configuration information used by the VMs 118, 119, 120 and 121, respectively, to establish a connection session with the database server 104. Each table 201-204 lists the IP address, netmask (NMSK) address, gateway (GWAY) address and port number (PORT) for the source device and the IP address and port number for the destination device. It is noted that the port number is not to be confused with the ports of the switch devices. A port from the perspective of the IP configuration information is an application-specific or process-specific software construct serving as a communications endpoint used by the Transport Layer protocols of the Internet Protocol Suite such as Transmission Control Protocol (TCP) or User Datagram Protocol (UDP) or the like. A specific port is identified by a corresponding port number. In table 201, for example, the VM1 118 with source address 192.168.0.13 using netmask address 255.255.0.0, gateway address 192.168.0.1 and port number 31294, establishes a connection with the database server 104 having IP address 10.5.12.7 using port number 1433. Table 201 for VM1 118 contains identical IP configuration information as table 203 for the VM1 120. Likewise, table 202 for VM2 119 contains identical IP configuration information as table 204 for the VM2 121. Nonetheless, it is desired that all four VMs 118-121 access the database server 104 separately without conflict.

A connection tracking table 220 is shown which is used by the translation logic 128 of the gateway device 106 for establishing the four communication connections without conflict. The connection tracking table 220 lists the internal source address, internal port number, and VID for each of the VMs 118-121 attempting to establish a connection session with the database server 104. The destination address and destination port number are also listed in the connection tracking table 220 and are the same for each connection. As shown in the connection tracking table 220, the internal source addresses, the internal port numbers, the destination addresses and the destination port numbers are identical for the VMs 118 and 120. The same situation exists between the VMs 119 and 121. This situation might otherwise result in a conflict since a conventional NAT does not consider VLAN tags. As shown, the VMs 118 and 120 are on different VLANs 15 and 25, respectively, and this information is used by the translation logic 128 to distinguish between the corresponding communication connections. The translation logic 128 employs a VLAN tagged 1:1 NAT function and assigns different external source addresses for the VMs 118 and 120 based on IP address and VID. As shown, the communication for VM1 118 is assigned an external source address 172.16.5.11 whereas the communication for VM1 120 is assigned an external source address 172.16.5.20. In this manner, the internal source address 192.168.0.13 within a frame from the VM1 118 is replaced with the external source address 172.16.5.11 before being forwarded to the database server 104. Similarly, the internal source address 192.168.0.13 within a frame from the VM1 120 is replaced with the external source address 172.16.5.20 before being forwarded to the database server 104. Likewise, the internal source address 192.168.0.14 within a frame from the VM2 119 is replaced with the external source address 172.16.5.32 and the internal source address 192.168.0.14 within a frame from the VM2 121 is replaced with the external source address 172.16.5.29 before being forwarded to the database server 104.

It is appreciated that the database server 104 receives four different communications from four different devices, each having a different source address. The database server 104 may respond to each using the different source addresses as the destination address for return communications. The translation logic 128 employs the information from the connection tracking table 220 to cross-reference between the internal and external source addresses of the VMs 118-121. For example, a communication frame from the database server 104 with destination address 172.16.5.20 is mapped to VM1 120 having address 192.168.0.13. The destination address of the frame is replaced with 192.168.0.13 and the frame header is programmed with VID 25 to identify the VLAN 131, and the return frame is forwarded to the switch device 107 via the trunked network link 108. The switch device 107 retrieves the destination address 192.168.0.13 and the VID 25, and uses this information to forward the return frame to the VM1 120 on the network link 111. The frame sent to the switch device 115 may not include the VID information, but this is inconsequential since the destination IP address is sufficient to identify the VM1 120 within the VLAN 131.

In summary, since two or more VMs are based on the same image, any deterministic network connection, such as an automated login to the external database server 104, would otherwise result in the same local and remote address and port selection. The gateway device 106 sees frames with different VLANs but identical IP source/destination address/port tuples. Because the gateway device 106 is connected via the trunked network link 108, and has a virtual interface on each VLAN, it can function as the default gateway for each VLAN. The gateway device 106 employs the connection tracking table 220 augmented to include VLAN tags (e.g., VID 15, 25, etc.). For traffic from the internal network 140 to the external network 141 (or other networks), the input VLAN tag or VID is associated with the connection stream, and provides a mechanism to determine uniqueness of connections that have identical source IP address, source port number, destination IP address, and destination port number. For traffic from any external network to one of the serviced internal networks (e.g., internal network 140), user-defined rules associate specific external IP addresses with known internal IP addresses on specific VLANs.

Figure 3:
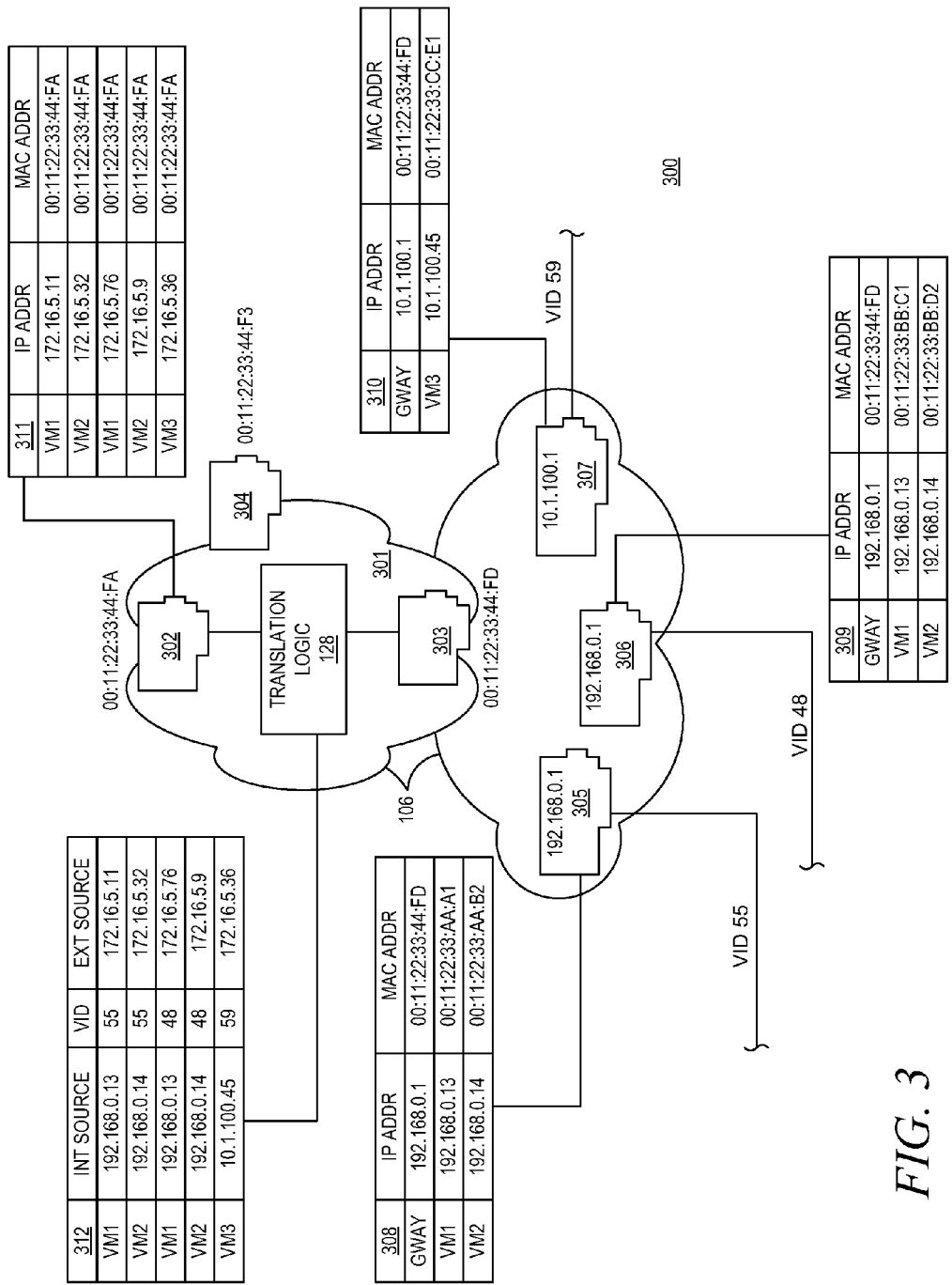
FIG. 3 is a more detailed block diagram of the gateway device of FIG. 1 implemented according to one embodiment and provided within another network.

FIG. 3 is a more detailed block diagram of the gateway device 106 implemented according to one embodiment and provided within a network 300. The gateway device 106 includes multiple interfaces, including an interface on an access switch port 302 for coupling to a different network (e.g., external network 141), an interface on a trunked switch port interface 303 for communicating with one or more VLANs within a local or internal network (e.g., local network 140), and a management interface on an access port 304. The management interface is for enabling communications with a management device, such as the control server 103, which may provide separate configuration and management functions. The interfaces 302, 303 and 304 are assigned media access control (MAC) addresses 00:11:22:33:44:FA, 00:11:22:33:44:FD, and 00:11:22:33:44:F3, respectively. In one embodiment, the access and trunked interfaces 302 and 303 are bridge port members in a common bridge 301, which further includes the translation logic 128 coupled to both of the interfaces 302 and 303. The specific IP and MAC address shown are for purposes of illustration only and may be any suitable values.

The trunked interface 303 has multiple virtual interfaces created from it, one per VLAN that is serviced. In the illustrated embodiment, three interfaces 305, 306 and 307 are provided for interfacing 3 separate VLANs having VIDs 55, 48 and 59, respectively. Each of the virtual interfaces 305-307 assumes the IP identity of the default gateway of the VLAN on which it resides. As shown, the default gateway for the interfaces 305 and 306 is 192.168.0.1 and the default gateway for interface 307 is 10.1.100.1. Each virtual interface 305-307 also maintains a routing table unique to it listing the internal IP address and MAC address for the gateway and for each of the VMs located within the corresponding VLAN. A first routing table 308 is provided for interface 305 which lists the internal IP addresses (192.168.0.13, 192.168.0.14) and corresponding MAC addresses (00:11:22:33:AA:A1, 00:11:22:33:AA:B2) for VMs VM1 and VM2, respectively, and which maps the default gateway IP address (192.168.0.1) to the MAC address of the interface 303 (00:11:22:33:44:FD). A second routing table 309 is provided for interface 306 which lists the internal IP addresses (192.168.0.13, 192.168.0.14) and corresponding MAC addresses (00:11:22:33:AA:C1, 00:11:22:33:AA:D2) for VMs VM1 and VM2, respectively, and which maps the default gateway IP address (192.168.0.1) to the MAC address of the interface 303 (00:11:22:33:44:FD). A third routing table 310 is provided for interface 307 which lists the internal IP address (10.1.100.45) and corresponding MAC address (00:11:22:33:CC:E1) for a single VM, VM3, and which maps the default gateway IP address (192.168.0.1) to the MAC address of the interface 303 (00:11:22:33:44:FD).

The translation logic 128 of the gateway device 106 employs a translation mapping table 312 to perform one-to-one NAT for each serviced virtual machine VM1, VM2 and VM3 of the VLANs. The translation mapping table 312 is a shortened version of the connection tracking table 220 previously described. The translation mapping table 312 maps each VM including VM1, VM2 and VM3 of each of the VLANs, the corresponding internal source addresses, the VIDs, and the corresponding external source addresses. As shown, a first IP address (192.168.0.13) of VM1 with VID 55 maps to a first external address (172.16.5.11), a second IP address (192.168.0.14) of VM2 with VID 55 maps to a second external address (172.16.5.32), a third IP address (192.168.0.13, same as first IP address) of VM1 with VID 48 maps to a third external address (172.16.5.76), a fourth IP address (192.168.0.14, same as second IP address) of VM2 with VID 48 maps to a fourth external address (172.16.5.9), and a fifth IP address (10.1.100.45) of VM3 with VID 59 maps to a fifth external address (172.16.5.36). In this manner, each internal device maps to a unique external address even if the internal addresses of any two or more internal devices are identical which would otherwise result in IP address conflict. The external addresses reside on the access interface 302 coupled to the external network.

A primary bridge routing table 311 is shown mapping each of the external addresses of the VMs to a MAC address (00:11:22:33:44:FA) assigned to the access switch port 302. The system responds to Address Resolution Protocol (ARP) requests for the external addresses via this interface. Because the routing tables are per-interface, each VLAN can support overlapped network ranges without ARP thrashing the primary bridge routing table 311. In the case of on-demand applications, an entirely duplicated network topology is supported with different virtual interfaces acting as the same gateway identity for a given copy of a network. The gateway device 106 maintains the translation mapping table 312 and uses configured rules to determine the address translation between traffic inbound to the external source, and the non-unique internal source.

Figure 4:
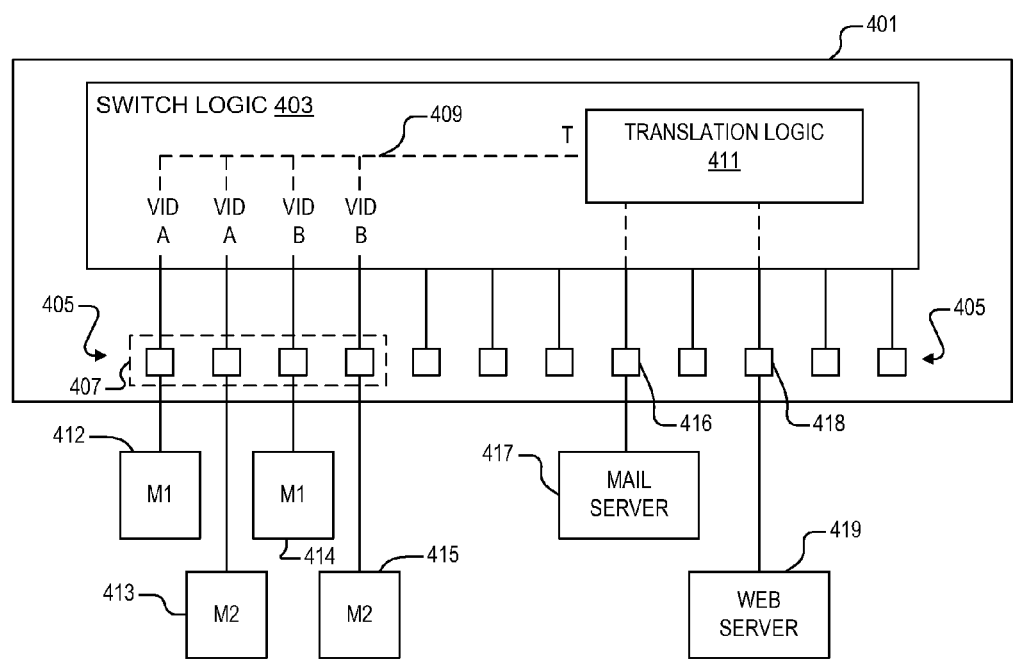
FIG. 4 is a block diagram of an integrated switch device according to one embodiment.

FIG. 4 is a block diagram of an integrated switch device 401 according to one embodiment. The switch device 401 includes switch logic 403 coupled to manage multiple switch ports 405. In one embodiment, the ports 405 are each programmable by the switch logic 403 according to desired configuration and function. In another embodiment, one or more of the ports 405 may be dedicated for particular functions. The first four ports 407 of the ports 405 are shown coupled to a corresponding one of four machines each based one of two machine types M1 and M2. A first machine 412 (M1) is coupled to the first port, a second machine 413 (M2) is coupled to the second port, a third machine 414 (M1) is coupled to the third port, and a fourth machine 415 (M2) is coupled to the fourth port. The machines 412-415 may be physical or virtual. Each M1 machine (412, 414) has the same internal network address and each M2 machine (413, 415) has the same internal address, although the internal network addresses of machines M1 and M2 are different. The first and second ports, which are coupled to machines 412 and 413, respectively, are configured by the switch logic 403 with a first VID "A" and the third and fourth ports, which are coupled to machines 414 and 415, respectively, are configured by the switch logic 403 with a second VID "B" so that there are no communication conflicts between the machines 412-415 separated into multiple VLANs. Although not shown, the switch logic 403 may configure additional ports with VID A or B as desired. The integrated switch device 401 illustrates that the switch function may be incorporated or integrated into a single switch device.

The integrated switch device 401 further includes translation logic 411 implemented according to one embodiment. As shown, the translation logic 411 is incorporated within the switch logic 403, although these logic functions may alternatively be implemented as separate logic blocks coupled together. The four ports 407 are coupled to the translation logic 411 via a trunked interface 409 so that the translation logic 411 sees the traffic and communications of each of the machines 412-415. The translation logic 411 is further configured to be coupled to a pair of ports 416 and 418 of the integrated switch device 401. A mail server 417 is coupled to port 416 and a WEB server 419 is coupled to port 418. In one embodiment, the ports 416 and 418 are provided within a common network and in another embodiment, the ports 416 and 418 are provided within separate or different networks. One or both of the ports 416 and 418 are considered within an "external" network relative to the VLANs containing the machines 412-415 and may be internal or external or even within a different VLAN assigned by the integrated switch device 401. In any case, the translation logic 411 enables communication between any of the machines 412-415 and the servers 417 and 419 located within a different network. For outgoing communications (from any of the ports 407 to ports in different networks), the translation logic 411 differentiates between the M1 machines 412 and 414 and between the M2 machines 413 and 415 based on VID and assigns four different external addresses to each of the machines 412-415. For incoming communications from external networks, e.g., from either one of the servers 417 and 419, the translation logic 411 differentiates from among the machines 412-415 as the appropriate destination based on one of the four external addresses as the destination address. The translation logic 411 exchanges the external address with the appropriate internal address, programs the appropriate VID, and provides the communication onto the trunked interface 409. The switch logic 403 forwards the communication onto the correct VLAN based on VID provided within the communications.

FIG. 5 is a block diagram illustrating frame information processing performed by an intermediate gateway device 511 implemented according to one embodiment on a frame sent by a local machine (LM) 501 within a local VLAN to a server 525 located on a different network, referred to as an "external" network. The local machine 501 represents a computer system or network device implemented as a virtual device or as a physical device and located within a VLAN with a VLAN tag or VID referred to as "A". The local machine 501 has a local IP address of 1.2.3.A and a MAC address of 11:22:33:44:AA. The particular addresses are arbitrary and used solely for purposes of illustration. The local machine 501 transmits a frame via a local switch device 502 intended for the server 525 located in an external network. The switch device 502 forwards a corresponding frame 503 to a trunked switch port interface 513 of the gateway device 511. In the illustrated embodiment, the frame 503 includes a VLAN tag header 505 (e.g., such as according to IEEE 802.1Q), an IP header 507, and a TCP header 509. The VLAN tag header 505 includes the source MAC address (11:22:33:44:AA) of the local machine 501, a destination MAC address (11:22:33:44:BB) of the trunked switch port interface 513 of the gateway device 511, and a VLAN tag value programmed with VID A. It is noted that the local machine 501 is not "VLAN aware" and thus does not provide the VID information within the frame (not shown) that it sends. The switch device 502 performs the VLAN function and programs VLAN tag the frame 503 with the VID A and further inserts the destination MAC address (11:22:33:44:BB) of the trunked switch port interface 513 of the gateway device 511. The IP header includes the source IP address (1.2.3.A) of the originating local machine 501 and the destination IP address (10.20.30.40) of the server 525. The TCP header 509 includes a source port number (e.g., 100) and the destination port number (e.g., 300) as shown.

The gateway device 511 receives the frame 503, generates a corresponding frame 517, and sends the frame 517 to the server 525 via an access switch port 515 interfacing the external network. The frame 517 also includes a VLAN tag header 519, an IP header 521, and a TCP header 523. The VLAN tag header 519 includes a source MAC address (11:22:33:44:CC), which is the MAC address of the access switch port 515, and a destination MAC address (11:22:33:44:DD) which is the MAC address of the server 525. The VID within the VLAN tag header 519 is not relevant (or otherwise not programmed) since the frame is processed through the external network. If the server 525 is in a different VLAN, then the VID is programmed with the appropriate VID. The IP header 521 includes a unique source IP address (5.6.7.8) provided by the gateway device 511 to differentiate the local machine 501 from other local machines as previously described. The IP header 521 includes a destination IP address (10.20.30.40) which is the IP address of the server 525. The TCP header 523 includes a source port number (e.g., 200) and the destination port number (e.g., 300) as shown.

FIG. 6 is a block diagram illustrating frame information processing performed by an intermediate gateway device 511 implemented according to one embodiment on a return frame sent by the server 525 to the local machine 501. In response to the frame 517 initiated by the local machine 501, the server 525 sends a frame 617 back to the local machine 501. The return frame 617 is configured in substantially the same manner as the frame 517 and includes the VLAN tag header 519, the IP header 521, and the TCP header 523. The source and destination MAC addresses in the VLAN tag header 519 are reversed, the source and destination IP addresses in the IP header 521 are reversed, and the source and destination port numbers in the TCP header 523 are also reversed as appropriate for the return frame 617. The gateway device 511 receives the frame 617 via the access switch port 515 and maps the destination IP address (5.6.7.8) to the local machine 501 within the VLAN having VID A. The gateway device 511 forwards a corresponding frame 603 via its trunked switch port interface 513 to the switch device 502 intended for the local machine 501. As shown, the frame 603 is configured in substantially the same manner as the frame 503 and includes the VLAN tag header 505, the IP header 507, and the TCP header 509. The source and destination MAC addresses in the VLAN tag header 505 are reversed, the source and destination IP addresses in the IP header 507 are reversed, and the source and destination port numbers in the TCP header 509 are also reversed as appropriate for the return frame 603. Furthermore, the gateway device 511 programs the VLAN tag header 505 of the frame 603 with the VLAN tag VID A. In this manner, the gateway device 511 maps the external IP address 5.6.7.8 to the local IP address 1.2.3.A of the local device 501 located within the VLAN identified by the VLAN tag VID A.

In general, first devices of a first network may be provisioned with the same first network addresses. The first network is sub-divided into multiple virtual networks (e.g., different VLANs), and those first devices with the same first network addresses are separated into different virtual networks according to virtual network identifiers. The communications of the first network are aggregated or combined within a gateway device providing access to a second network associated with second network addresses. The second network is different from the first network and may be another local network, a different or external network, a public or other wide area network (WAN), etc. The gateway device assigns a unique second network address to each first device of the first network. Thus, those first devices having the same first network address within different virtual networks are assigned different second network addresses. The gateway device maps between each second network address and each unique combination of first network address and virtual network identifier.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention.

The invention claimed is:
1. A data transmission method comprising:
 receiving a first frame at a first port of a switch having a plurality of ports, wherein:
  each of the ports is associated with a unique Virtual Local Area Network (VLAN) and a VLAN tag that uniquely identifies the VLAN such that the switch can ascertain that packets received on a particular port are from a virtual machine assigned to the VLAN associated with the particular port;
  the first port is associated with a first VLAN and a first VLAN tag;
  the first frame comprises data from a first virtual machine having an internal source IP address and a MAC address and located on an internal computer network that includes at least a second virtual machine that has the identical internal source IP address of the first virtual machine but the first and second virtual machines are assigned by a control server to different VLANs, such that the first and second virtual machines cannot be uniquely identified solely by their internal source IP address but can be uniquely identified by a combination of their internal source IP address and the VLAN to which each virtual machine is assigned, wherein the virtual machines do not store VLAN tags identifying the VLAN to which they are assigned;
  a header of the first frame includes the internal source address of the first virtual machine but does not include a VLAN tag identifying the VLAN to which the first packet is assigned;
 ascertaining, at the switch, by virtue of the first frame having been received at the first port, that the first virtual machine is assigned to the first VLAN, wherein the ascertaining that the first virtual machine is assigned to the first VLAN is performed by the switch because the first frame does not have a VLAN tag that identifies the VLAN to which the first virtual machine is assigned;
 creating, at the switch, a second frame, and embedding into the second frame:
  the data received from the first virtual machine,
  a source IP address that is the internal source IP address of the first virtual machine;
  a destination IP address of a server that is intended to receive the data sent from the first virtual machine;
  a source MAC address that is the MAC address of the virtual machine;
  a destination MAC address of a trunked port interface of a gateway device intended to receive the second frame, wherein the trunked port interface provides an interface to the VLANs associated with the ports of the switch;
  a source port;
  a destination port; and
  the first VLAN tag, wherein the switch embeds the first VLAN tag into the second frame because the first frame does not have a VLAN tag;

wherein the internal source IP address and the first VLAN tag cooperate to uniquely identify the first virtual machine from which the switch received the data;

transmitting the second frame from the switch to the trunked port interface of the gateway device;

translating, using translation logic of the gateway device, the combination of the internal source IP address and the first VLAN tag of the second frame into an external source IP address that uniquely identifies the virtual machine to an external server;

creating, at the gateway device, a third frame, and embedding into the third frame:
- the data of the second frame;
- a source MAC address that is the MAC address of an access switch port of the gateway device;
- a destination MAC address that is the MAC address of the server intended to receive the data sent from the first virtual machine;
- the external source IP address generated by the translation logic;
- a destination IP address that is the IP address of the server intended to receive the data sent from the first virtual machine;
- a source port number; and
- a destination port number;

and transmitting the third frame to the server intended to receive the data sent from the first virtual machine, wherein the server is an external server located on a computer network that is external to the internal computer network of the virtual machines.

2. The method of claim 1, wherein the translating includes referring to a connection mapping table which maps between a plurality of external source IP addresses and a plurality of combinations of internal source IP addresses and VLAN tags.

3. The method of claim 1, wherein the translating includes performing 1:1 network address translation for each internal source IP address of each VLAN.

* * * * *